(12) United States Patent
Shinohara (10) Patent No.: US 6,731,336 B1
(45) Date of Patent: May 4, 2004

(54) SOLID-STATE IMAGING APPARATUS WITH SELF-COMPENSATING VOLTAGE SUPPLY CIRCUIT

(75) Inventor: Mahito Shinohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/399,816

(22) Filed: Sep. 21, 1999

(30) Foreign Application Priority Data

Sep. 28, 1998 (JP) .......................................... 10-273648

(51) Int. Cl.[7] .......................... H04N 3/14; H04N 5/335
(52) U.S. Cl. ........................ 348/308; 348/294; 348/302
(58) Field of Search ................................ 348/300, 302, 348/303, 304, 305, 306, 307, 308, 281, 294, 301

(56) References Cited

U.S. PATENT DOCUMENTS

| | | | | |
|---|---|---|---|---|
| 5,572,051 A | * | 11/1996 | Arakawa et al. | ............ 257/225 |
| 5,705,837 A | * | 1/1998 | Tanigawa et al. | ............ 257/223 |
| 5,710,446 A | * | 1/1998 | Chi et al. | .................... 257/225 |
| 5,981,932 A | * | 11/1999 | Guerrieri et al. | ........ 250/208.1 |
| 6,208,010 B1 | * | 3/2001 | Nakazato et al. | ............ 257/544 |
| 6,239,839 B1 | * | 5/2001 | Matsunaga | .................. 348/308 |
| 6,365,950 B1 | * | 4/2002 | Sohn | .......................... 348/294 |

* cited by examiner

Primary Examiner—Wendy R. Garber
Assistant Examiner—Justin Misleh
(74) Attorney, Agent, or Firm—Fitzpatrick, Cella, Harper & Scinto (57) ABSTRACT

A solid-state imaging apparatus includes a photoelectric conversion pixel having a photoelectric conversion device and an amplifier circuit for amplifying a signal supplied from the photoelectric conversion device. A voltage supply circuit supplies a reset voltage at least to the photoelectric conversion pixel. Thus, the fixed pattern noise generated by variations in the gain of the individual pixels and variations of the threshold is suppressed, and changes of the fixed pattern noise caused by the operating conditions of the solid-state imaging apparatus are also prevented.

8 Claims, 7 Drawing Sheets

SOLID-STATE IMAGING APPARATUS WITH SELF-COMPENSATING VOLTAGE SUPPLY CIRCUIT

BACKGROUND OF THE INVENTION

1. Field of the Invention

The present invention relates to a solid-state imaging apparatus including a reset-level supply circuit for supplying a predetermined reset level to photoelectric conversion pixels.

2. Description of the Related Art

Figure 1:
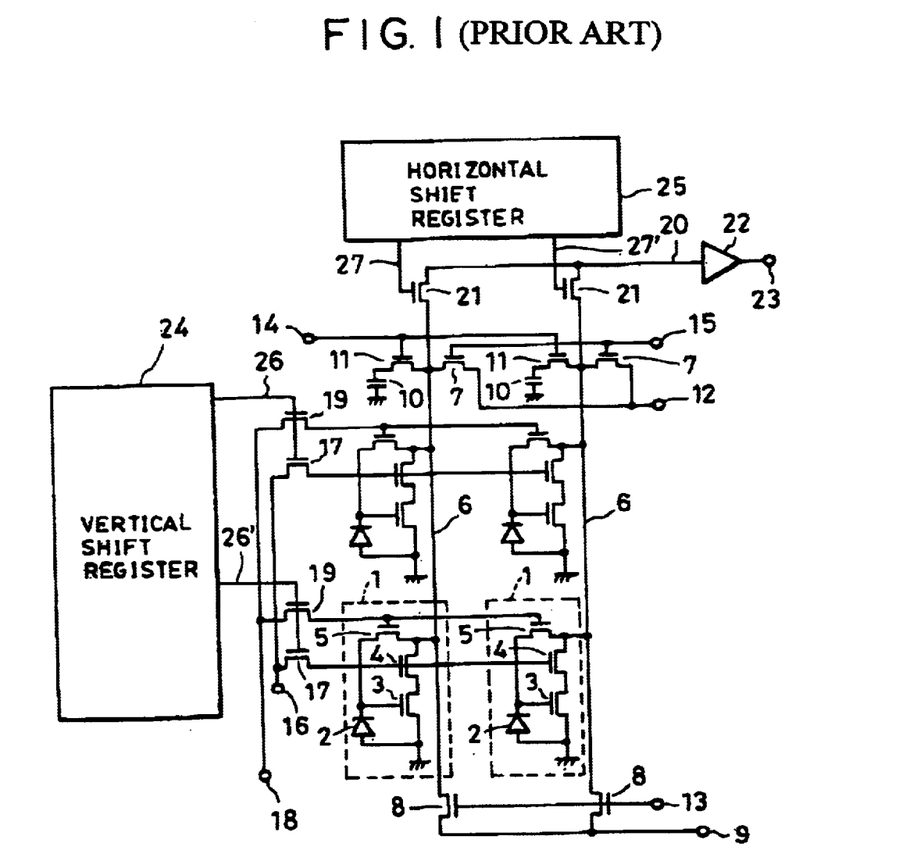
FIG. 1 is a circuit diagram illustrating the internal configuration of a conventional solid-state imaging apparatus.

Referring to the circuit diagram illustrating a conventional signal-amplifying solid-state imaging apparatus shown in FIG. 1, a pixel 1 is formed of a photodiode 2 for converting a light signal into an electric charge; an amplifying MOS transistor 3 for storing the light signal charge, converting the voltage of the charge and outputting it; a selection MOS transistor 4 which serves as a selection switch for the pixel 1; and a resetting MOS transistor 5 for resetting the photodiode 2 and the amplifying MOS transistor 3.

Devices for resetting the pixel 1 include a resetting MOS transistor 8 for resetting the pixel 1, a terminal 13 for supplying a reset pulse to the resetting MOS transistor 8, a reset voltage terminal 9 for temporarily supplying a reset voltage to the pixel 1, a terminal 18 for inputting a switch pulse into the resetting MOS transistor 5 of the pixel 1, and a line-selecting MOS transistor 19 for selecting the line to which the pulse output from the terminal 18 is applied according to the output of a vertical shift register 24.

Devices for storing an output voltage of the pixel 1 include a capacitor 10 for temporarily storing the output voltage of the pixel 1, a MOS transistor 11 for reading and writing the charge of a vertical output line 6 from and into the capacitor 10, a terminal 14 for supplying a write/read pulse to the MOS transistor 11, a current-load MOS transistor 7 that forms, together with the amplifying MOS transistor 3, an inversion amplifier, a terminal 15 for supplying a load pulse to the MOS transistor 7, a power supply terminal 12 for supplying a supply voltage to the MOS transistors 3 and 7, a terminal 16 for supplying a transfer pulse to the selection MOS transistor 4, and a buffer MOS transistor 17 for buffering the pulse output from the terminal 16.

Devices for reading an output voltage from the pixel 1 include the vertical output line 6 for outputting a pixel signal, a horizontal output line 20 for outputting an output voltage of the individual pixels 1, a transfer MOS transistor 21 for transferring the stored voltage of the capacitor 10 to the horizontal output line 20 according to an output of a horizontal shift register 25, a preamplifier 22 for amplifying the horizontal output line 20 and outputting it, an output terminal 23 of the preamplifier 22, vertical shift register lines 26 and 26' of the vertical shift register 24, and horizontal shift register lines 27 and 27' of the horizontal shift register 25.

For simple representation, a 2×2-pixel matrix is shown in FIG. 1. Although the MOS transistor shown in FIG. 1 is an N-type MOS transistor, it may be formed by a P-type MOS transistor, in which case, the polarity of the driving pulse may be inverted, and the power supply and the ground may also be inverted.

Figure 2:
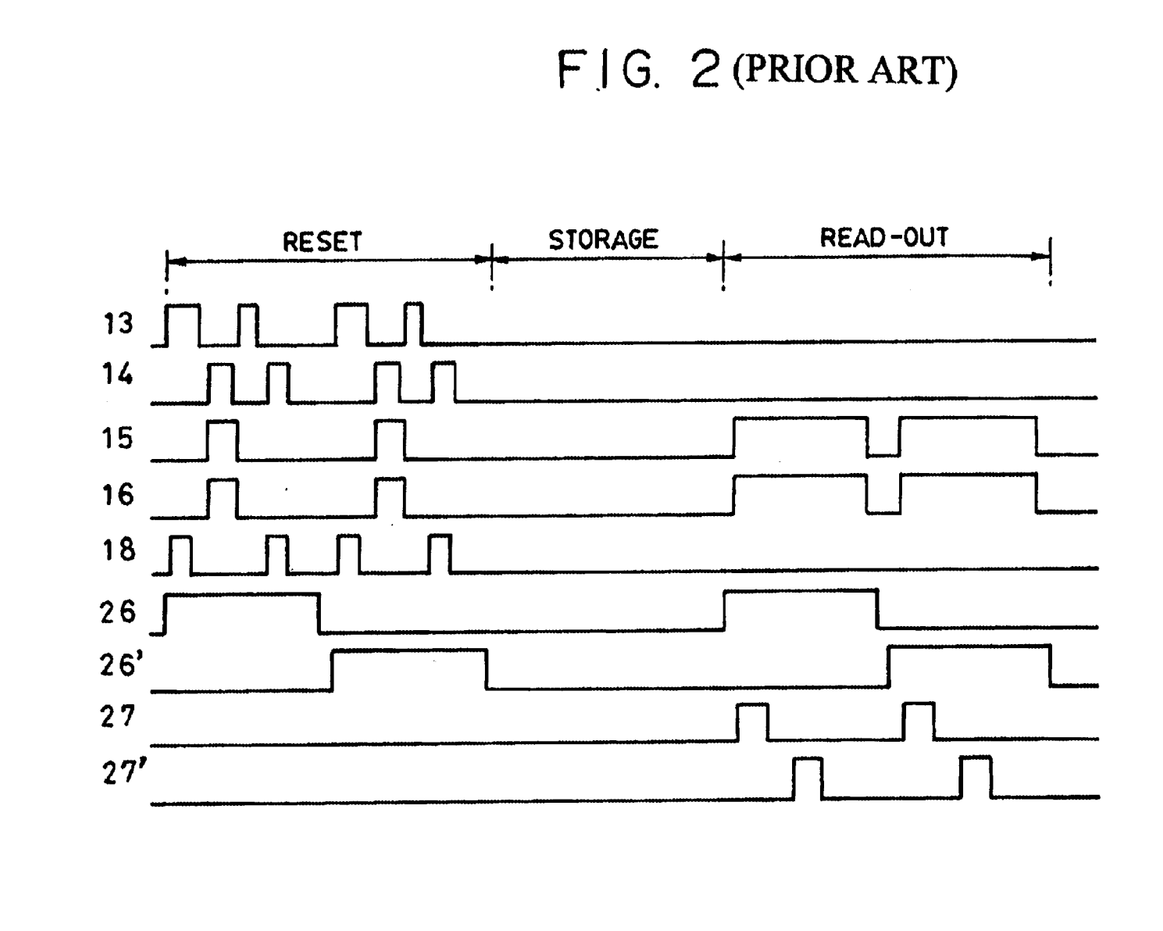
FIG. 2 is a timing chart of drive pulses applied to a conventional solid-state imaging apparatus.

FIG. 2 is a timing chart of drive pulses for the circuit shown in FIG. 1. The operation of a conventional solid-state imaging apparatus is described below with reference to FIG. 2.

In the solid-state imaging apparatus, the pixels 1 are first reset by an output of the vertical shift register 24 via the vertical shift register lines 26. This resetting operation is performed by sequentially resetting the individual lines, i.e., the first line, the second line, and so on, of the output lines 26.

More specifically, the resetting operation is performed as follows. The terminals 13 and 18 are first caused to be at a high level, and the resetting MOS transistors 5 and 8 corresponding to the line selected by the line-selecting MOS transistor 19 are switched on, thereby resetting the cathodes of the photodiodes 2 and the gates of the amplifying MOS transistors 3 having light-signal electric charges. Accordingly, when the voltage supplied from the reset voltage terminal 9 is indicated by $V_{RS}$, the reset voltage to be applied to the pixels 1 is also indicated by $V_{RS}$.

Subsequently, the terminals 14, 15, and 16 are caused to be at a high level, and the MOS transistors 11, 7, and 4 corresponding to the line selected by the line-selecting MOS transistor 17 are activated, thereby storing the outputs of the pixels 1 obtained immediately after the pixels 1 have been reset to the capacitor 10. It is now assumed that the output voltage after resetting the pixels 1 is indicated by $V_{RS}+N_S$. Before resetting the pixels 1 to ($V_{RS}+N_S$) again, the terminal 13 is switched on so that the vertical output lines 6 can be reset to $V_{RS}$, which is the voltage of the reset voltage terminal 9, via the resetting MOS transistor 8.

After switching off the terminal 13, the terminals 14 and 18 are caused to be at a high level, and the pixels 1 are reset to the voltage ($V_{RS}+N_S$) again, which is the same voltage as the capacitor 10, via the MOS transistors 5 and 11.

The charge-storing operation and the charge-reading operation are as follows. The photoelectrically converted charge is stored in the photodiode 2 and the gate of the amplifying MOS transistor 3. After a predetermined period, a signal from the vertical shift register 24 is supplied via the vertical shift register line 26 to the MOS transistors 4 corresponding to the selected line. The terminals 15 and 16 are then caused to be at a high level, and the voltages of the photoelectrically converting pixels 1 are inverted and amplified by using the load current MOS transistors 7 and the amplifying MOS transistors 3 corresponding to the selected line, thereby reading out the voltages of the pixels 1 to the vertical output lines 6. By causing the horizontal shift register 25 to scan, the MOS transistors 21 are sequentially selected via the horizontal shift register lines 27. Accordingly, the output voltages of the pixels 1 are read out from the signal output terminal 23 via the output line 20 and the preamplifier 22.

When the input voltage and the output voltage of the pixel 1 are indicated by $V_{IN}$ and $V_O$, respectively, and the gain of an inversion amplifier formed by the MOS transistors 3 and 7 is represented by $g_S$, the input/output characteristics of the inversion amplifier are expressed by:

$$V_O = -g_S \cdot V_{IN} + V_C$$

where $V_C$ indicates a voltage which is determined by the power supply voltage and the threshold of the MOS transistors 3 and 7. Accordingly, if the signal voltage stored in the pixel 1 is designated by $-S$, the input voltage $V_{IN}$ is expressed by $V_{RS}+N_S-S$. Thus, the output voltage of the pixel 1 is expressed by the following equation.

$$V_O = -g_S(V_{RS}+N_S-S) + V_C$$

According to the reset operation, the following equation relating input voltage $V_{RS}$ and output voltage ($V_{RS}+N_S$) is given by:

$$V_{RS}+N_S=-g_S \cdot V_{RS}+V_C$$

Therefore, $V_O$ is expressed by the following equation.

$$V_O=-g_S(-g_S \cdot V_{RS}+V_C-S)+V_C=g_S^2 \cdot V_{RS}+(1-g_S)V_C+g_S \cdot S$$

The above voltage $V_C$ is changed according to the threshold voltage of the MOS transistors 3 and 7.

Generally, since the parameter of the MOS transistor 3 forming the pixel 1 varies to some extent among the pixels 1, the offset level of the pixel 1, i.e., $g_S^2 \cdot V_{RS}+(1-g_S)V_C$ appears as fixed pattern noise. In order to increase the signal-to-noise (S/N) ratio, the fixed pattern noise should be eliminated, and thus, the parameters of the MOS transistors 3 and 7 are determined so that $g_S$ is equal to 1.

In the above-described conventional apparatus, however, it is difficult to suppress the fixed pattern noise generated by variations in the gains $g_S$ of the inversion amplifiers of the individual pixels 1. That is, even if it is desired that $g_S$ is set to be 1, there are variations in the parameters of the individual pixels 1, and the gain $g_S$ is varied among the pixels 1. As a result, the fixed pattern noise may appear in different levels according to the pixels 1.

More specifically, if a difference of the gain between the pixels 1 is designated by $\Delta g_S$, the gain $g_S$ can be indicated by $1+\Delta g_S$, and the offset potential of each pixel 1 is represented by $(1+\Delta g_S)^2 V_{RS} - \Delta g_S \cdot V_C$. Accordingly, the fixed pattern noise is generated in the individual pixels 1 in different levels according to the difference of gain $\Delta g_S$.

Additionally, because of a change in the voltage $V_C$ according to variations of the power supply voltage and variations of the temperature, the fixed pattern noise itself is changed, thereby failing to obtain a high quality image.

SUMMARY OF THE INVENTION

Accordingly, it is an object of the present invention to suppress the fixed pattern noise caused by variations in the gain of the individual pixels and in the threshold.

It is another object of the present invention to obtain a high quality image by eliminating variations in the fixed pattern noise caused by the operating conditions of a solid-state imaging apparatus.

In order to achieve the above objects, according to one aspect of the present invention, there is provided a solid-state imaging apparatus including a photoelectric conversion pixel and a self-compensating voltage supply circuit that supplies a reset voltage to the photoelectric conversion pixel.

According to another aspect of the present invention, there is provided a solid-state imaging apparatus including (1) a photoelectric conversion pixel having a photoelectric conversion device and a first amplifier circuit for amplifying a signal supplied from the photoelectric conversion device and (2) a voltage supply circuit including a second amplifier circuit that supplies a reset voltage at least to the photoelectric conversion pixel. The second amplifier circuit has a circuit structure configured similar to that of the first amplifier circuit.

According to a further aspect of the present invention, there is provided a solid-state imaging apparatus including (1) a photoelectric conversion pixel having a photoelectric conversion device and (2) a voltage supply circuit that supplies a reset voltage used for resetting the photoelectric conversion pixel. The reset voltage is supplied from a node at which a control electrode portion of a transistor and an output portion of the transistor are connected, the transistor being configured similarly to a transistor in the photoelectric conversion pixel.

Further objects, features, and advantages of the present invention will become apparent from the following description of the preferred embodiments with reference to the attached drawings.

DESCRIPTION OF THE PREFERRED EMBODIMENTS

First Embodiment

Figure 3:
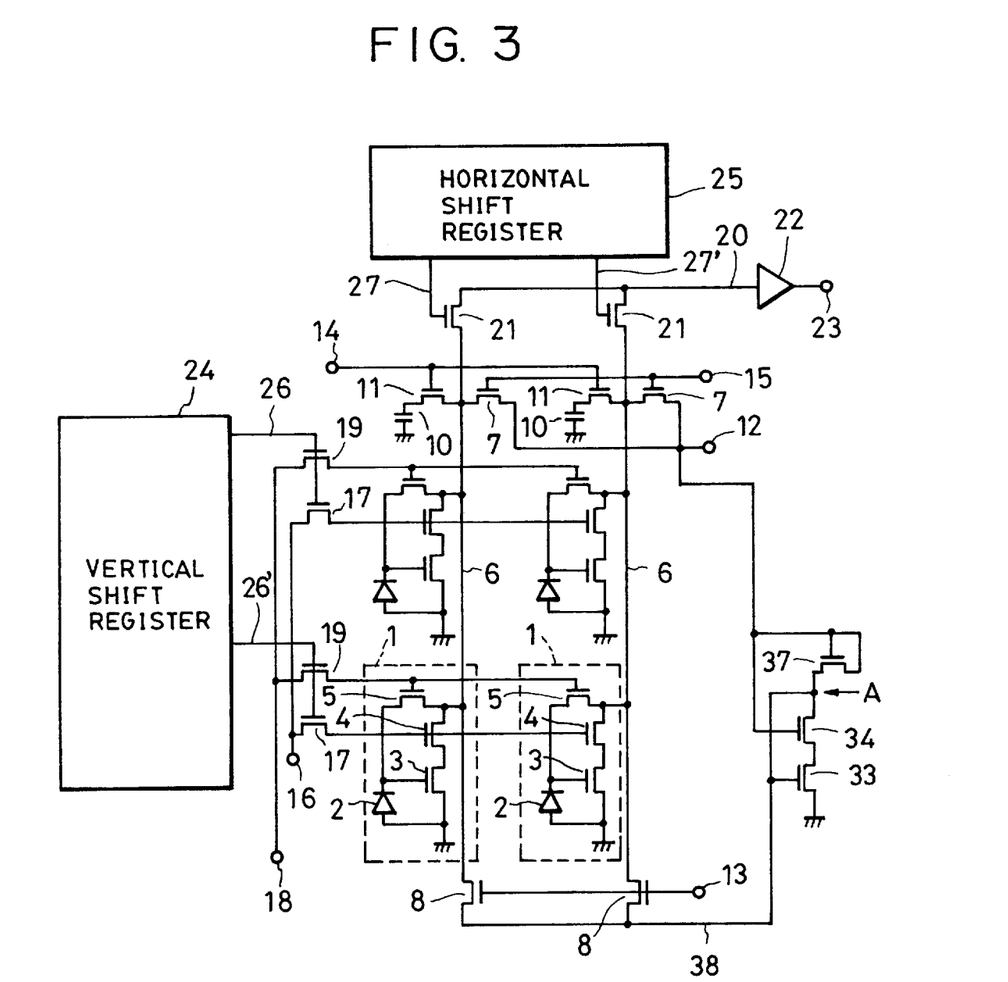
FIG. 3 is a circuit diagram illustrating the internal configuration of a solid-state imaging apparatus according to a first embodiment of the present invention.

Referring to the circuit diagram illustrating a solid-state imaging apparatus according to a first embodiment of the present invention shown in FIG. 3, a pixel 1 is formed of a photodiode 2 for converting a light signal into an electric charge; an amplifying MOS transistor 3 for storing the light signal charge, converting the voltage of the charge, and outputting it; a selection MOS transistor 4 which serves as a selection switch for the pixel 1; and a resetting MOS transistor 5 for resetting the photodiode 2 and the amplifying MOS transistor 3.

Devices for resetting the pixel 1 include a resetting MOS transistor 8 for resetting the pixel 1, a terminal 13 for supplying a reset pulse to the resetting MOS transistor 8, a terminal 18 for inputting a switch pulse into the resetting MOS transistor 5 of the pixel 1, and a line-selecting MOS transistor 19 for selecting the line to which the pulse output from the terminal 18 is applied according to the output of a vertical shift register 24.

Devices for storing an output voltage of the pixel 1 include a capacitor 10 for temporarily storing the output voltage of the pixel 1, a MOS transistor 11 for reading and writing the charge of a vertical output line 6 from and into the capacitor 10, a terminal 14 for supplying a write/read pulse to the MOS transistor 11, a current-load MOS transistor 7 that forms, together with the amplifying MOS transistor 3, an inversion amplifier, a terminal 15 for supplying a load pulse to the MOS transistor 7, a power supply terminal 12 for supplying a supply voltage to the MOS transistors 3 and 7, a terminal 16 for supplying a transfer pulse to the selection MOS transistor 4, and a buffer MOS transistor 17 for buffering the pulse output from the terminal 16.

Devices for reading an output voltage from the pixel 1 include the vertical output line 6 for outputting a pixel signal, a horizontal output line 20 for outputting an output voltage of the individual pixels 1, a transfer MOS transistor 21 for transferring the stored voltage of the capacitor 10 to the horizontal output line 20 according to an output of a horizontal shift register 25, a preamplifier 22 for amplifying the voltage on the horizontal output line 20 and outputting it, an output terminal 23 of the preamplifier 22, vertical shift register lines 26 and 26' of the vertical shift register 24, and horizontal shift register lines 27 and 27' of the horizontal shift register 25.

In this embodiment, MOS transistors 33, 34, and 37 are further provided. The MOS transistors 33, 34, and 37 are configured similarly to the MOS transistors 3, 4, and 7 according to the same manufacturing process.

The MOS transistors 33 and 37 form an inversion amplifier, which is similar to that in the pixel 1, across the constantly activated MOS transistor 34. As discussed above, in the aforementioned conventional apparatus, a constant potential supplied from the power supply terminal 9 is used as the reset potential for the pixel 1. In contrast, in this embodiment, the gate potential of the MOS transistor 33 and the potential of the point A, at which the common drains of the MOS transistors 34 and 37 are connected, are set to be the reset potential of the pixel 1.

The operation of this embodiment is as follows. As described in the configuration of this embodiment, the MOS transistors 33, 34, and 37 are provided. The MOS transistors 33, 34, and 37 are operated by a power supply voltage supplied from the power supply terminal 12. In response to the supply voltage from the power supply terminal 12, the voltage determined by the MOS transistors 33, 34, and 37 is read out to a reset potential supply line 38 and is set to be the reset potential. The subsequent operation is similar to that of the conventional apparatus, and an explanation thereof will thus be omitted.

If the reset potential in this embodiment is indicated by $V_{RS'}$, the following equation holds true.

$$V_{RS'} = -1 \cdot V_{RS} + V_{CO}$$

The above equation is further modified into:

$$V_{RS'} = V_{CO}/2$$

where $V_{CO}$ is a voltage determined by the power supply voltage and the threshold of the MOS transistors 33 and 37.

According to the conventional apparatus, the fixed pattern noise $(1+\Delta g_S)^2 V_{RS} - \Delta g_S \cdot V_C$ is generated due to the difference of the gain $\Delta g_S$. However, in this embodiment, the reset potential $V_{RS'}$ becomes one-half $V_{CO}$ and is a voltage determined by the power supply voltage and the threshold of the MOS transistors 33 and 37. Accordingly, the output offset of the pixel 1 is represented by the following expression.

$$V_{CO}(1+\Delta g_S^2)/2 + \Delta g_S(V_{CO}-V_C)$$

The MOS transistors 33 and 37 are configured similarly to the MOS transistors 3 and 7, respectively. Thus, $V_{CO}-V_C$ is only slightly varied according to the manufacturing process and is hardly changed according to the power supply voltage and the temperature.

Thus, variations in the output offset caused by the individual pixels 1 are merely the product of $V_{CO}/2$ and a negligible amount $\Delta g_S$.

Consequently, in this embodiment, the fixed pattern noise is significantly reduced compared to that generated in the conventional apparatus. Additionally, the effect of suppressing the fixed pattern noise is free from the power supply voltage and the temperature. As a result, a high-quality quality image signal can be obtained.

Second Embodiment

Figure 4:
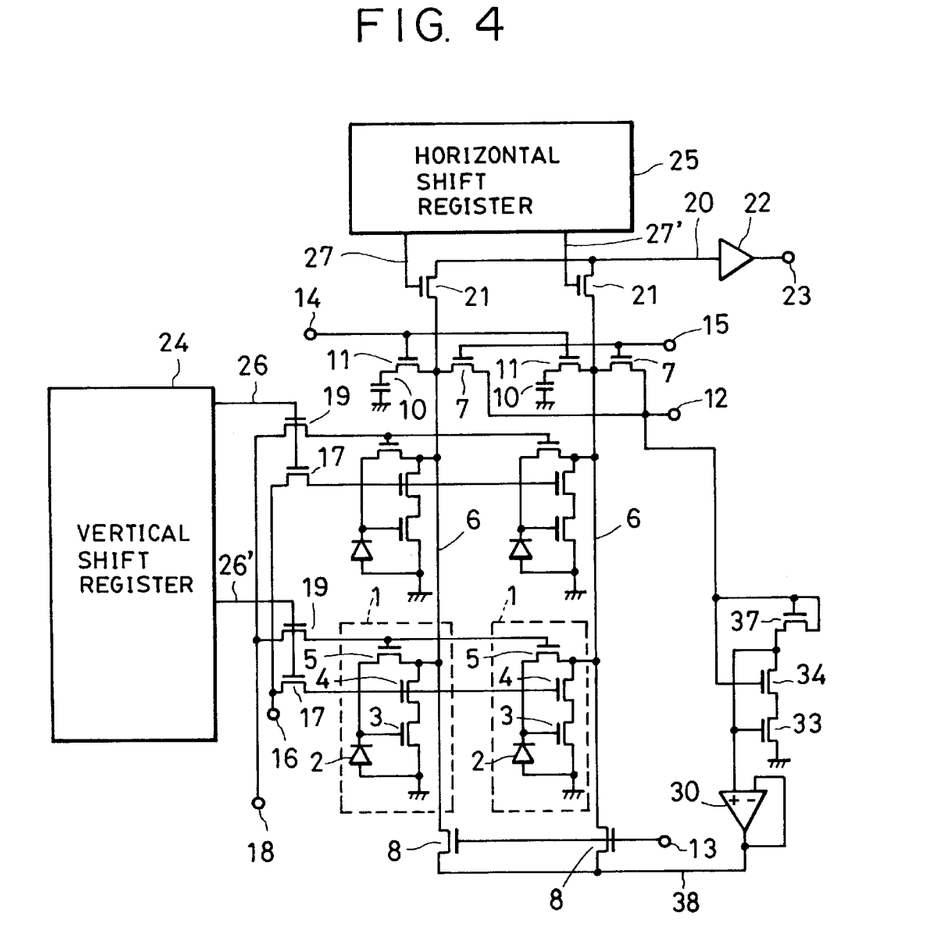
FIG. 4 is a circuit diagram illustrating the internal configuration of a solid-state imaging apparatus according to a second embodiment of the present invention.

FIG. 4 illustrates a solid-state imaging apparatus according to a second embodiment of the present invention. The second embodiment differs from the first embodiment in that a voltage follower 30 is provided at a stage prior to the reset potential supply line 38. The other configurations are similar to those of the first embodiment, and an explanation thereof will thus be omitted by designating the same reference numerals.

The voltage follower 30 serves as a buffer for reducing the impedance of the reset voltage, which is determined by the MOS transistors 33, 34, and 37, thereby expediting the resetting operation of the pixels 1.

Third Embodiment

Figure 5:
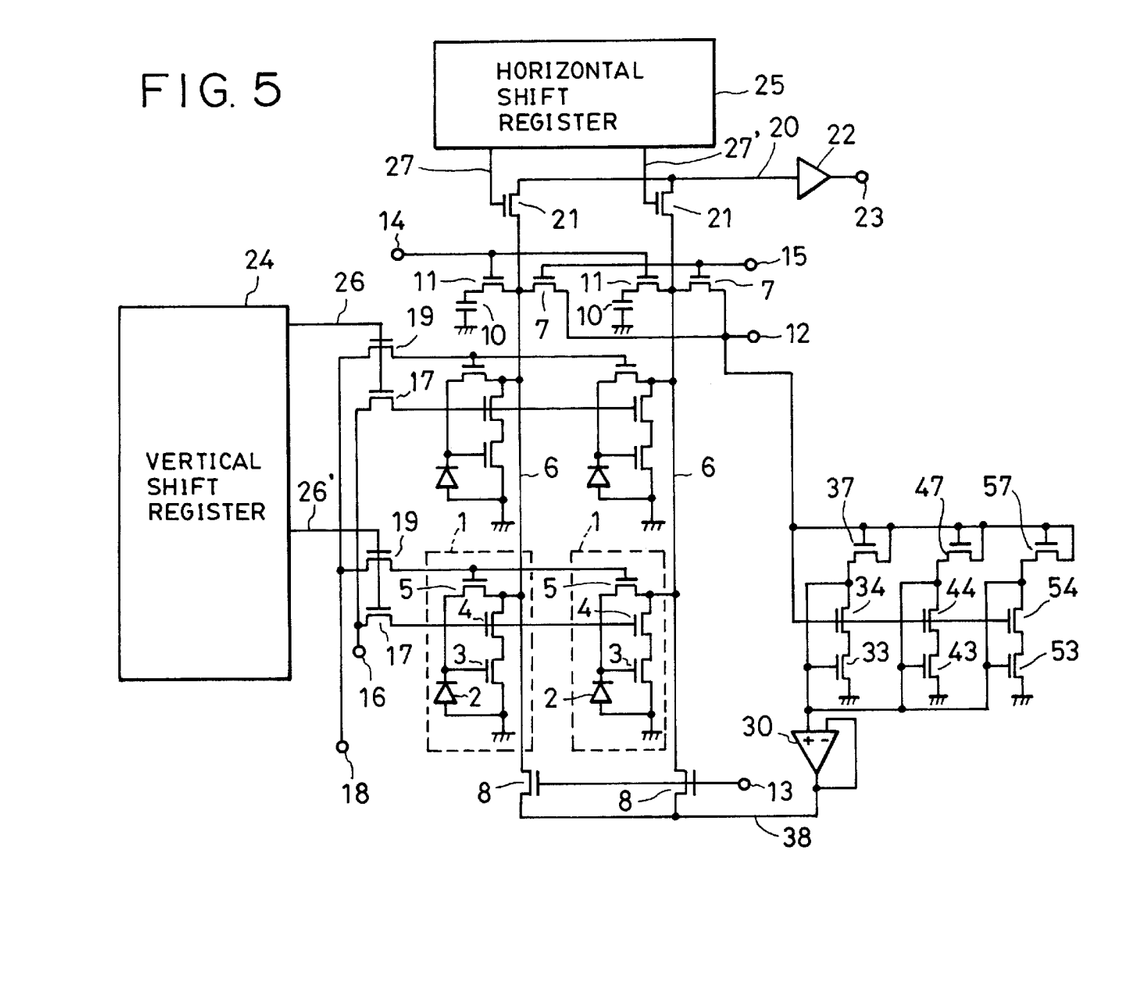
FIG. 5 is a circuit diagram illustrating the internal configuration of a solid-state imaging apparatus according to a third embodiment of the present invention.

FIG. 5 illustrates a solid-state imaging apparatus according to a third embodiment of the present invention. MOS transistors 43 and 53 are a similar type to the MOS transistor 33; MOS transistors 44 and 54 are a similar type to the MOS transistor 34; and MOS transistors 47 and 57 are a similar type to the MOS transistor 37.

In this embodiment, two reset-voltage setting circuits are added, as illustrated in FIG. 5, to the solid-state imaging apparatus of the second embodiment shown in FIG. 4, and the three circuits are placed in parallel to each other. The other configurations are similar to those of the second embodiment, and an explanation thereof will thus be omitted.

In operation, the voltages set in the reset-voltage setting circuits are coupled and are input into the input portion of the voltage follower 30. The resetting operation of the pixel 1 and the operation of the reset-voltage setting circuits are similar to those of the first embodiment, and an explanation thereof will thus be omitted. It should be noted that the number of reset-voltage setting circuits is not restricted to three.

Accordingly, as in this embodiment, by increasing the number of reset-voltage setting circuits, $V_{CO'}$ can be determined by the average of the output voltages of a plurality of reset-voltage setting circuits. This increases the probability of approximating $V_{CO'}$ to the average of $V_C$ and a secondary minimal amount, thus $\Delta g_S(V_C - V_{CO})$ can be further reduced.

Hence, the advantage of reducing the fixed pattern noise is even greater in this embodiment than that of the first embodiment. Additionally, the speed of the resetting operation for the pixel 1 achieved in the second embodiment can be maintained. Thus, a high-quality image signal can be obtained at a high speed.

Fourth Embodiment

Figure 6:
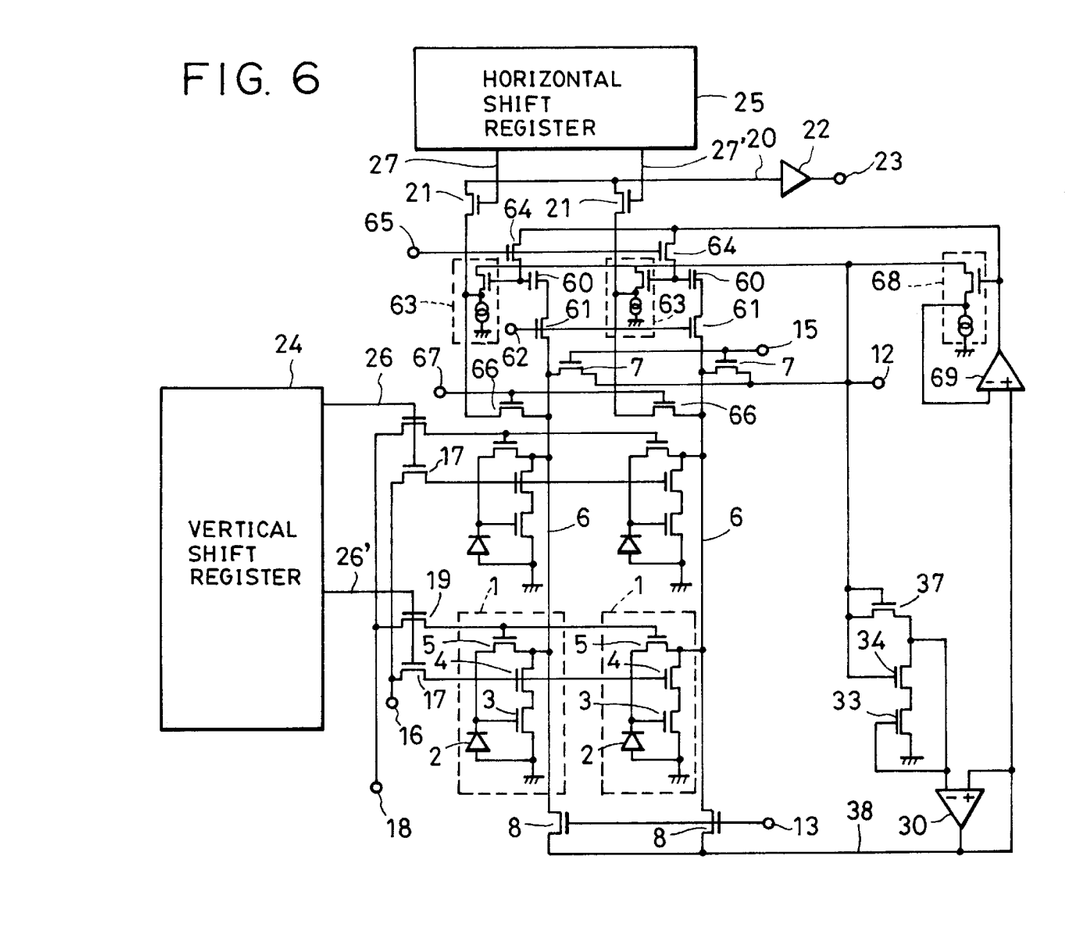
FIG. 6 is a circuit diagram illustrating the internal configuration of a solid-state imaging apparatus according to a fourth embodiment of the present invention.

FIG. 6 illustrates a solid-state imaging apparatus according to a fourth embodiment of the present invention. The solid-state imaging apparatus of this embodiment includes clamp capacitors 60 for clamping outputs of the pixels 1, MOS transistors 61 for switching the vertical output lines 6 and the clamp capacitors 60, a terminal 62 for applying a pulse to the gate of the MOS transistor 61, source followers 63 connected at their gate input portions to the clamp capacitors 60, MOS transistors 64 for switching the input portions of the source followers 63, a terminal 65 for applying a pulse to the gates of the MOS transistors 64, MOS transistors 66 for switching the output portions of the source followers 63 and the vertical output lines 6, a terminal 67 for applying a pulse to the gates of the MOS transistors 66, a source follower 68, which is the same type as the source follower 63, and an operational amplifier 69 for outputting the reset potential to the input gates of the source followers 63. The other configurations of the fourth embodiment are similar to those of the second embodiment, and an explanation thereof will thus be omitted.

Figure 7:
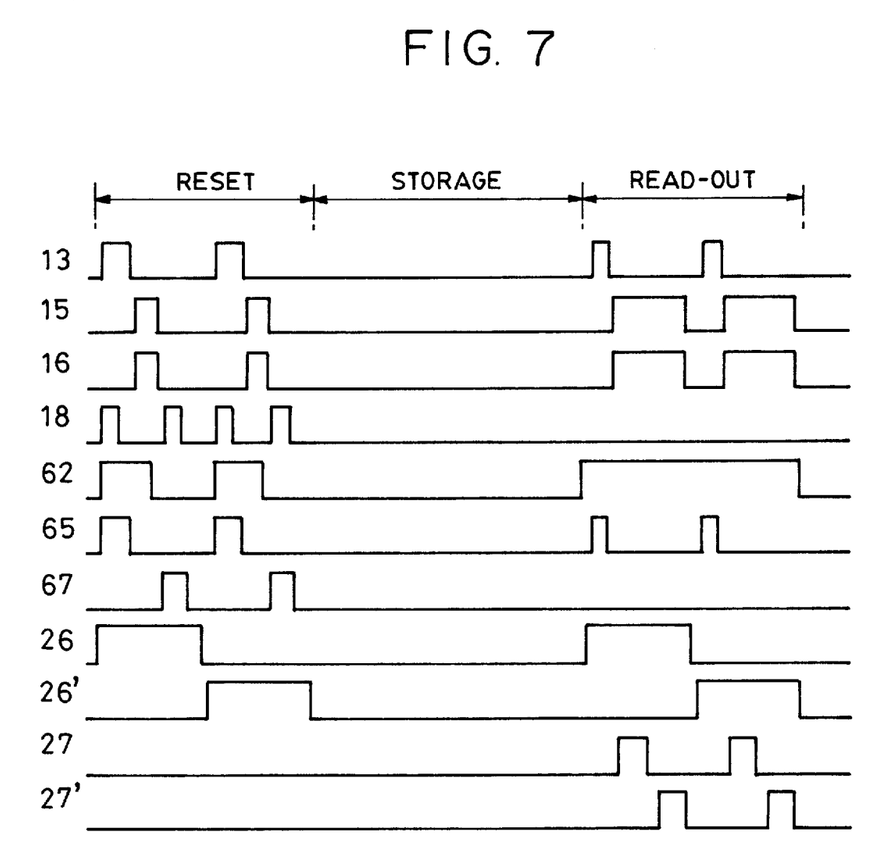
FIG. 7 is a timing chart of drive pulses applied to the solid-state imaging apparatus of the fourth embodiment.

The operation of the fourth embodiment is discussed below with reference to the timing chart of drive pulses shown in FIG. 7.

Lines of the pixels 1 are first reset by an output of the vertical shift register 24 via the vertical shift register lines 26 in the order of the first line, the second line, and so on.

More specifically, the resetting operation of this embodiment is similar to that of the first, second, and third embodiments in that the terminals 13 and 18 are caused to be at a high level so that the cathodes of the photodiodes 2 and the gates of the MOS transistors 3 are set to be the reset potential. However, the fourth embodiment differs from the foregoing embodiments in that the terminals 62 and 65 are also caused to be at a high level so as to switch on the MOS transistors 61 and 64, thereby clamping the input portions of the source followers 63. The clamp potential is set relative to the output potential of the operational amplifier 69. As in the second embodiment, when the voltage supplied from the reset potential supply line 38 is designated by $V_{RS'}$, the reset voltage of the pixel 1 is also indicated by $V_{RS'}$.

Subsequently, after the terminals 13, 18, and 65 are changed to be at a low level, the terminals 15 and 16 are caused to be at a high level. This activates the MOS transistors 7 and 4 so that an output of the pixel 1 is read out to the capacitor 60 via the vertical output line 6 by using the MOS transistors 3 and 7, and is clamped in the capacitor 60.

Then, after the terminals 15, 16, and 62 are changed to be at a low level, the terminals 18 and 67 are caused to be at a high level. This activates the MOS transistors 5 and 66, and the pixel 1 can be re-reset by the output potential of the source follower 63. That is, in contrast to the first, second, and third embodiments in which the capacitor 10 is used for re-resetting the pixel 1, the source follower 63 and the capacitor 60 are used for re-resetting the pixel 1 in the fourth embodiment.

As a consequence, the provision of the clamp capacitor 60 and the source follower 63 prevent a reduction in the re-reset potential even if the vertical output line 6 has a large capacitance. The pixels 1 can thus be suitably re-reset.

The terminals 13, 62, and 65 are first caused to be at a high level to clamp the gate of the source follower 63. Thereafter, the terminals 13 and 65 are changed to be at a low level, and the terminal 16 is caused to be at a high level. Thus, the pixels of the lines selected by the vertical shift register 24 are output.

In order to minimize the level of the fixed pattern noise generated in the output of each pixel 1, it is required that the initial reset potential $V_{RS'}$ of each pixel 1 becomes equal to the output of the pixel 1 obtained immediately after the pixel has been reset. When the potential of the operational amplifier 69 is input into the input portion of the source follower 63, it is also required that the output of the source follower 63 becomes equal to $V_{RS'}$.

To meet the above requirements even if the power supply and the temperature are changed, the following conditions should also be satisfied. As to the source follower 68 and the operational amplifier 69, a source follower and an operational amplifier which are the same type as the source follower 63 should be used. The output $V_{RS'}$ of the operational amplifier 30 is connected to one input terminal (+) of the operational amplifier 69, and the output portion of the source follower 68 is connected to the other input terminal (−) of the operational amplifier 69. The output of the operational amplifier 69 is connected to the gate, i.e., the input terminal, of the source follower 68. With this arrangement, the condition for achieving a minimal level of the fixed pattern noise, irrespective of the operating conditions, can be met.

Accordingly, in this embodiment, a capacitor for storing the photoelectrically converted charge of the pixel 1 is substituted by the source follower 63 provided with a clamping function. Thus, even with a large parasitic capacitance of the output line 6, the re-resetting potential can be prevented from being lowered, thereby suitably eliminating noise. Thus, a high-quality image signal can be obtained.

A solid-state imaging apparatus of the first through fourth embodiments offers the following advantages.

Photoelectric conversion pixels are reset by a reset voltage, and are re-reset by output potentials of the pixels immediately after the pixels have been reset, thereby eliminating the noise generated during the resetting operation.

A voltage supply circuit formed of transistors similar to transistors loaded in a photoelectric conversion pixel and serving as an amplifier is provided within a solid-state imaging apparatus, so that the re-reset potential becomes equal to the reset potential. The input portion and the output portion of the transistors which serve as an amplifier are connected, and the potential of the connecting portion is used as a reset voltage. With this configuration, the fixed pattern noise of the pixel can be minimized irrespective of the operating conditions.

It is thus possible to provide a solid-state imaging apparatus that outputs a high-quality image signal having a high S/N ratio.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A solid-state imaging apparatus comprising:
   a photoelectric conversion pixel including a photoelectric conversion device and first amplifying means for amplifying a signal supplied from said photoelectric conversion device; and
   voltage supply means including second amplifying means for supplying a reset voltage at least to said photoelectric conversion pixel, wherein said second amplifying means has a circuit structure similar to a circuit structure of said first amplifying means,
   wherein said voltage supply means outputs a voltage from a node at which an input portion and an output portion of said second amplifying means are connected.

2. A solid-state imaging apparatus according to claim 1, wherein said photoelectric conversion device of said photoelectric conversion pixel is a photodiode, and said photoelectric conversion pixel comprises a transistor for storing a light signal charge, for converting a voltage of the charge, and for outputting the converted charge, a selection switch used for performing the voltage conversion and the voltage output, and a resetting transistor for resetting said photodiode and said transistor.

3. A solid-state imaging apparatus comprising:
   a photoelectric conversion pixel including a photoelectric conversion device and first amplifying means for amplifying a signal supplied from said photoelectric conversion device; and
   voltage supply means including second amplifying means for supplying a reset voltage at least to said photoelectric conversion pixel, wherein said second amplifying means has a circuit structure similar to a circuit structure of said first amplifying means, wherein said voltage supply means comprises a transistor for converting a voltage and outputting the converted voltage, a selection switch used for the voltage conversion and the voltage output, and a current-load transistor that forms, together with said transistor, an inversion amplifier.

4. A solid-state imaging apparatus comprising:

a photoelectric conversion pixel including a photoelectric conversion device and first amplifying means for amplifying a signal supplied from said photoelectric conversion device;

voltage supply means including second amplifying means for supplying a reset voltage at least to said photoelectric conversion pixel, wherein said second amplifying means has a circuit structure similar to a circuit structure of said first amplifying means; and a first operational amplifier, which is a voltage follower, at a stage subsequent to an output terminal of said voltage supply means.

5. A solid-state imaging apparatus according to claim 4, wherein said voltage supply means further comprises an operational amplifier, which is a voltage follower.

6. A solid-stage imaging apparatus according to claim 4, wherein a plurality of said voltage supply means are provided.

7. A solid-state imaging apparatus according to claim 4, wherein said voltage supply means further comprises a second operational amplifier for receiving inputs from said first operational amplifier and a first source follower, and for outputting a voltage to a second source follower, said second source follower outputting said reset voltage.

8. A solid-stage imaging apparatus comprising:

a photoelectric conversion pixel including a photoelectric conversion device; and a voltage supply circuit for supplying a reset voltage used for resetting said photoelectric conversion pixel, said reset voltage being supplied from a node at which a control electrode portion of a transistor and an output portion of said transistor are connected, said transistor being configured similarly to a transistor in said photoelectric conversion pixel.

* * * * *

UNITED STATES PATENT AND TRADEMARK OFFICE
CERTIFICATE OF CORRECTION

PATENT NO. : 6,731,336 B1
DATED : May 4, 2004
INVENTOR(S) : Mahito Shinohara

It is certified that error appears in the above-identified patent and that said Letters Patent is hereby corrected as shown below:

Column 5,
Line 64, "quality" should be deleted.

Column 10,
Lines 1 and 10, "solid-stage" should read -- solid-state --.

Signed and Sealed this

Fourteenth Day of December, 2004

JON W. DUDAS
*Director of the United States Patent and Trademark Office*